METHOD OF PRODUCING VANADIUM DIOXIDE THIN FILMS

Filed Nov. 18, 1968

INVENTORS E.N. FULS
D.H. HENSLER
M.H. ISBANSKY
A.R. ROSS

BY George S. Indig
ATTORNEY

United States Patent Office 3,491,000
Patented Jan. 20, 1970

3,491,000
METHOD OF PRODUCING VANADIUM DIOXIDE THIN FILMS

Ellis N. Fuls, Bernardsville, Donald H. Hensler, Chatham, Michael H. Isbansky, Bayonne, and Alexander R. Ross, Piscataway Township, Middlesex County, N.J., assignors to Bell Telephone Laboratories, Incorporated, Murray Hill, N.J., a corporation of New York Filed Nov. 18, 1968, Ser. No. 776,732
Int. Cl. C23f *17/00;* C23b *5/50*
U.S. Cl. 204—38 7 Claims

ABSTRACT OF THE DISCLOSURE $VO_2$ thin films exhibiting abrupt changes in conductivity of the order of greater than $10^3$ within a narrow range of transition temperatures are formed on top of $Ta_2O_5$ films prepared by oxidation of a tantalum substrate.

BACKGROUND OF THE INVENTION

Field of the invention

This invention relates to a method of forming $VO_2$ thin films, and to the resulting product.

Description of the prior art

Recent interest has been shown in materials which are able to undergo a metal-semiconductor phase transition at a characteristic temperature. Accompanying the transition are abrupt and substantial changes in various properties of the materials, such as changes in its electrical resistance, light reflectance, etc. Devices which make use of these changes have been devised. Exemplary of those devices which take advantage of the abrupt change in resistance are switching devices as described in U.S. Patent 3,149,298, issued to E. T. Handelman.

Significant among the materials which possess such a phase transition is vanadium dioxide. It is important that this material be in a form that is compatible with the modern planar device technology. However, the metal-semiconductor phase transition characteristic of the bulk form is generally difficult to obtain in thin films of vanadium dioxide, except where such films are formed on expensive single crystal substrates. For example, while the ratio of the change in conductivity at the transition temperature (about 68° C.) of single crystal $VO_2$ and $VO_2$ films on single crystal substrates of sapphire or rutile is about $10^3$ or $10^4$, values no greater than $10^2$, insufficient for many contemplated device uses, are typically obtained for $VO_2$ films on glass, glazed ceramic, or silicon substrates.

SUMMARY OF THE INVENTION

According to the invention, $VO_2$ films are formed on thin films containing $Ta_2O_5$ previously formed by oxidation of a tantalum-containing surface. Such $VO_2$ films exhibit abrupt changes in conductivity with temperature about as large as those observed in $VO_2$ single crystals.

DETAILED DESCRIPTION

The substrate surface, that is, the surface upon which the $VO_2$ is to be formed, should be formed by oxidizing a surface containing at least 40 percent by weight of tantalum. The tantalum-containing surface may be produced by sputtering or evaporation of tantalum onto a supporting material, or may even be a solid metal body. Oxidation to $Ta_2O_5$ may then be achieved by any of a number of methods, for example, by oven oxidation, aqueous anodization or gas phase anodization (the latter sometimes referred to either as oxygen plasma anodization or glow discharge anodization). Since it is important only to form a surface suitable for the formation of $VO_2$ thereon, it is, of course, not necessary to completely oxidize the tantalum layer.

The substrate surface containing tantalum prior to oxidation may additionally contain aluminum in the amount of up to 60 atomic percent so that oxidation would result in a surface comprising a mixed oxide of tantalum and aluminum. A surface containing more than 60 percent may evidence galvanic corrosion under high humidity conditions.

The presence of other additives in the substrate surface is not critical, amounts of up to 40 atomic percent being tolerable, beyond which there exists the danger that such impurities may interfere with the formation of a suitable $VO_2$ film, such as by diffusion or chemical interaction. In the case where the tantalum-containing surface is formed by sputtering, the principal impurities present will ordinarily be those from the sputtering atmosphere, typically argon, which may be present in amounts up to 20 atomic percent, based on the same considerations.

Figure 1:
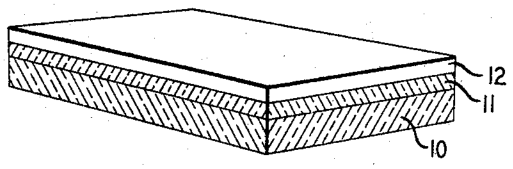
FIG. 1 is a perspective view of one embodiment of the inventive product.

Referring now to FIG. 1, there is shown a planar structure according to a preferred embodiment of the inventive product, in which material 10 supports $Ta_2O_5$ film 11 and $VO_2$ film 12. It is a principal advantage of the invention that support 10 may be of any material provided, of course, that it can withstand subsequent processing conditions, for example, those needed for formation of the supported films thereon, to be described. Typical support materials could be glass, glazed ceramic, silicon, fused quartz or even a solid metal body, such as tantalum.

The conditions used in cathodic sputtering are known (see Vacuum Deposition of Thin Films, L. Holland, J. Wiley & Sons, New York, 1956). However, to aid the practitioner the following exemplary procedures for sputtering Ta and oxidizing the resultant film to $Ta_2O_5$ is briefly described. Sputtering is achieved by bombardment of the Ta cathode by some ionized non-reactive gas, typically argon. Increasing the pressure within the chamber increases the sputtering rate, due to the larger number of bombarding ions present.

The maximum pressure is that at which sputtering can be reasonably controlled within the prescribed tolerances, while the minimum pressure is determined by the lowest deposition rate which is commercially practicable.

The cathode current density should be adjusted to within the range .50 to 250 ma./cm.$^2$, the lower limit providing an adequate deposition rate and film density, and the upper limit establshing a practical maximum to avoid short apparatus life due to excessive heat generated in the plasma. Typical voltages to meet this requirement depend of course upon the size of the cathode, and for a five-inch square cathode, range from about 2000 to 10,000 volts, the range of 4000 to 5000 volts being preferred.

For the above-specified operating conditions, the substrate-cathode spacing may generally be up to ten inches, above which the deposition rate is impractically slow.

Substrate temperatures are not critical for formation of the Ta film, although above 2000° C. film formation will generally be difficult of achievemnt. A temperature of from 300° C. to 500° C. may be preferred where well-formed films are desired.

Once formed, the Ta film may be placed in an oxidizing oven at a temperature of from 350° C to 1800° C., below which oxidation will generally not occur and above which any resultant film of $Ta_2O_5$ would melt. A temperature of from 400° C. to 500° C. results in substantial conversion of a 100 A. to 6000 A. thick film of Ta to $Ta_2O_5$ in about 4 to 16 hours.

Alternatively, the sputtered tantalum film may be anodized in an appropriate electrolyte, such as dilute nitric acid, boric acid, acetic acid, citric acid or tartaric acid. The usual procedure followed is similar to conventional anodizing processes in which a low voltage is applied initially and the voltage increased during anodization. Typically, a voltage up to 120 v. is applied at a maximum current density of 1 ma./cm.$^2$ until the current drops to zero.

The method of forming the $VO_2$ film is not critical, formation by reactive sputtering, or by critical annealing of $V_2O_5$ or $VO_x$ films (where $x$ is less than 2) being suitable (see, for example, MacChesney et al., J. Electrochem. Soc., 115, 1, January 1968, p. 52; Polito and Rozganyi, J. Electrochem. Soc., 115, 1, January 1968, p. 56), although formation by reactive sputtering may be preferred as a one-step process resulting in good quality films. The conditions for vanadium sputtering are similar to those already described for tantalum.

The amount of oxygen present in the sputtering chamber is critical to the obtaining of a suitable product, and is indicated by its partial pressure as well as by the amount of gas flowing through the chamber per unit of time. The optimum amount of oxygen will generally be that which results in formation of $VO_2$. Increasing oxygen above this amount will first result in oxygen-doped $VO_2$, which is generally undesirable in that it results in a decrease in the magnitude of the change in resistivity at the transition temperature. Even greater amounts of oxygen may result in formation of $V_2O_5$. Too little oxygen results in a non-stoichiometric product, which may be represented by $VO_x$, where $x$ is less than 2. Partial pressures of oxygen within which $VO_2$ is obtainable without substantial $O_2$ doping are from $5\times10^{-4}$ mm. Hg up to $2\times10^{-3}$ mm. Hg. provided the throughput of gas is maintained between the limits of $30\times10^3$ to $50\times10^3\mu$ liters per minute. It is good practice to outgas the reaction chamber prior to backfilling with argon and oxygen before each deposition run (typically at about 450° C. for 60 to 90 minutes) in order to maintain close control over the oxygen content.

The presence of oxygen in the reaction chamber in the amounts indicated will generally have an adverse effect on the production of bombarding ions and consequently on the rate of deposition. It is known to counteract this effect by use of a triode system in which a filament and anode are positioned so as to cause a current to flow between the cathode and substrate in a direction transverse to their normal axes, thereby increasing the number of bombarding ions. Typically, a current flow of from 200 to 300 milliamps will result in an increase in the deposition rate by a factor of 2 to 3.

For the above-specified operating conditions, the cathode-substrate spacing may generally be from one to ten inches, below which excessive argon doping of the film is likely and above which the deposition rate is impractically slow. Argon may be present in the $VO_2$ film, however, in amounts up to 4 weight percent, without substantial impairment of the electrical characteristics of the film. Additionally, minor amounts of Ta and Mo may be present (in amounts up to 5 weight percent) without significant impairment of the magnitude of the change in conductivity.

The thickness of the $VO_2$ film is not critical, films up to $100\mu$ in thickness having been repeatedly cycled through the transition point without any mechanical failure having been observed.

Substrate temperatures may vary from 300° C. to 500° C., below which $VO_2$ is no longer attainable and above which damage to the film or substrate is likely. A temperature of from 350° C. to 450° C. is preferred, based on the above considerations.

Figure 2:
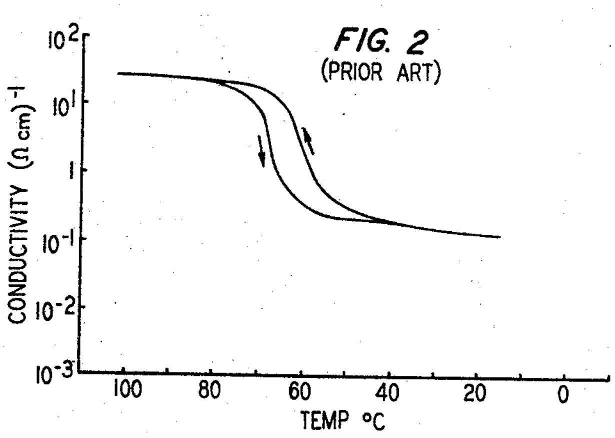
FIG. 2 (PRIOR ART)
FIG. 2 is a graph of the conductivity $(ohm\text{-}cm.)^{-1}$ versus temperature (° C.) for a $VO_2$ film on a glass substrate (prior art)

Referring now to FIG. 2, there is depicted a graph of conductivity in ohm-cm. versus temperature in ° C. of a $VO_2$ film formed on a glass slide. It is seen that the change in conductivity is less than $10^2$ over a transition temperature range of about 20° C.

EXAMPLE 1

Tantalum was sputtered in a bell jar having an argon pressure of $20\mu$ with a foreline pressure of $100\mu$, onto a glass slide held at about 400° C., for about 2 minutes, resulting in a tantalum film about 320 A. thick. The film was then heated overnight in an air oven at 500° C. to convert to $Ta_2O_5$.

Figure 3:
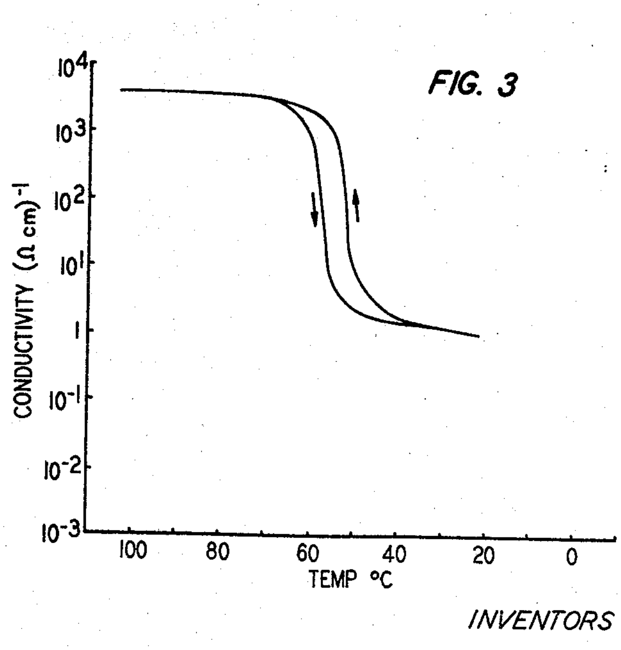
FIG. 3 is a graph of the conductivity $(ohm\text{-}cm.)^{-1}$ versus temperature (° C.) for a $VO_2$ film on a $Ta_2O_5$ film.

Using a triode system in which the cathode was at 4600 volts and the filament at 200 volts, vanadium was then reactively sputtered for about 30 minutes at an argon pressure of about $17\mu$ and an oxygen partial pressure of about $4\times10^{-4}\mu$, with a foreline pressure of $100\mu$, onto the $Ta_2O_5$ film held about 6.3 cm. from the cathode, and heated to about 400° C., resulting in a $VO_2$ film about 1500 A. thick. The conductivity was then measured as a function of temperature for the $VO_2$ film. The results are depicted graphically in FIG. 3. It is seen that the change in conductivity is greater than $10^3$ over a transition temperature range of slightly more than 10° C.

EXAMPLE 2

The procedure of Example 1 was followed except that the sputtered tantalum film was converted to $Ta_2O_5$ by means of contacting it with a .02 percent citric acid electrolyte, and anodizing it to 120 volts, at up to 1 milliamp per square centimeter until the current dropped to zero. The results obtained were comparable to those obtained in Example 1 and depicted in FIG. 3.

The invention has been described in terms of a limited number of embodiments. Since it essentially teaches the formation of $VO_2$ films on surfaces comprising $Ta_2O_5$ other embodiments are contemplated. For example, formation of the substrate surface by anodization of a tantalum layer completely covered by an aluminum layer, as described in application Ser. No. 404,740, filed Oct. 19, 1964, is contemplated. Such formation would be advantageous if it is desired to deposit the $VO_2$ film directly onto conventionally fabricated thin film devices. It should be noted, however, that the thickness of the aluminum layer should be from about 100 to 1000 A. and other conditions should be such that upon anodization the formation of a surface comprising predominantly $Al_2O_3$ is avoided.

What is claimed is:

1. The method of forming a $VO_2$ thin film characterized in that the $VO_2$ thin film is formed on a thin film comprising $Ta_2O_5$ and further characterized in that the thin film comprising $Ta_2O_5$ is formed by the method comprising formation of a substrate containing at least 40 atomic percent tantalum followed by oxidation of the surface of the substrate.

2. The method of claim 1 in which said oxidation is carried out by heating the surface containing tantalum in an oxidizing atmosphere.

3. The method of claim 1 in which said oxidation is carried out by contacting the surface containing tantalum with a liquid electrolyte and anodizing said surface.

4. The method of claim 1 in which the surface containing tantalum is formed by sputtering of tantalum.

5. The method of claim 1 in which the $VO_2$ film is formed by the method comprising sputtering of vanadium in the presence of oxygen.

6. The method of claim 1 in which the $VO_2$ film has a conductivity change ratio of at least $10^3$ over the transition temperature range.

7. The product produced by the method of claim 1.

References Cited

UNITED STATES PATENTS

| | | | |
|---|---|---|---|
| 3,294,653 | 12/1966 | Keller et al. | 204—15 |
| 3,258,413 | 6/1966 | Pendergast | 204—192 |

JOHN H. MACK, Primary Examiner

R. L. ANDREWS, Assistant Examiner

U.S. Cl. X.R.

117—69; 148—6.3